Feb. 26, 1963  F. E. YOUNG, JR  3,078,946
MOVABLE STEERING COLUMN
Filed March 24, 1961  3 Sheets-Sheet 1

FRANK E. YOUNG, JR
*INVENTOR.*

BY John R. Faulkner
Keith L. Zerschling
ATTORNEYS

Feb. 26, 1963  F. E. YOUNG, JR  3,078,946
MOVABLE STEERING COLUMN
Filed March 24, 1961  3 Sheets-Sheet 2

FRANK E. YOUNG, JR.
*INVENTOR.*

BY *John C. Faulkner*
*Keith L. Zerschling*
ATTORNEYS

Feb. 26, 1963     F. E. YOUNG, JR     3,078,946

MOVABLE STEERING COLUMN

Filed March 24, 1961     3 Sheets-Sheet 3

FRANK E. YOUNG, JR
*INVENTOR.*

BY John C. Faulkner
Keith L. Zerschling

ATTORNEYS

United States Patent Office 3,078,946
Patented Feb. 26, 1963

3,078,946
MOVABLE STEERING COLUMN
Frank E. Young, Jr., Inkster, Mich., assignor to Ford Motor Company, Dearborn, Mich., a corporation of Delaware
Filed Mar. 24, 1961, Ser. No. 98,107
3 Claims. (Cl. 180—82)

This invention relates to movable motor vehicle steering columns and more particularly to a latch mechanism for movable steering columns.

The present trend in motor vehicle body styling is toward a low body silhouette. To maintain adequate interior head room with the present low roof levels, it has been necessary to provide a lower positioning of the vehicle seats. Attendant with the low seat placement, steering columns are now supported in a substantially horizontal position with the steering wheel overlying the driver's seat. Although comfort has not been sacrificed with the present seating position, the low placement of the seat coupled with the overlying position of the steering wheel has produced a vehicle that is rather difficult for the driver to enter and leave.

To facilitate ingress and egress of the driver to and from the vehicle, it has been proposed to support the steering wheel and column for swinging movement away from the driver's seat inwardly toward the center of the vehicle. This will permit unencumbered entry and exit of the vehicle by the driver.

The convenience and desirability of movable steering columns can be enhanced if certain safety features are incorporated into their construction. One safety feature which is not only desirable but also necessary is the provision of a mechanism to lock the column in the normal operative position precluding movement of the column when the vehicle is in motion. It is additionally desirable to provide a locking mechanism that is automatic in its operation, requiring no separate engagement by the operator. A still additional safety factor to be provided is a mechanism that will prevent the transmission of power from the vehicle engine to the drive wheels when the steering column is displaced from its normal operative position.

An object of this invention is to provide a steering column that may be inwardly displaced to allow free movement of the driver to and from the vehicle.

A further object of this invention is to provide a latch mechanism for the column that is actuated by the transmission ratio selector. The latch locks the column in the normal operative position while the engine is transmitting power to the drive wheels.

A still further object of this invention is the provision of a latch mechanism that prevents transmission of power to the drive wheels when the column is displaced from its normal position.

This invention relates to a movable steering column that enables the steering wheel to be inwardly displaced allowing free ingress and egress by the driver. A latch mechanism is provided to lock the steering column in its normal operative position. The latch mechanism is mechanically coupled to the transmission ratio selector to be operated thereby. As is conventional, the vehicle transmission is provided with at least one nonpower transmitting or "neutral" condition. When the selector is placed in a position corresponding to the nonpower transmtting condition of the transmission, the latch mechanism is released allowing the column to be moved inwardly. The transmission ratio selector lever cannot be placed in a power transmitting position when the column is displaced. The engine may, however, be running with the column displaced. If the column is in its normal operative position, selection of a power transmitting condition of the transmission by actuation of the selector engages the latch mechanism to lock the steering column in the normal position.

The patent application of Stuart M. Frey, Serial No. 32,221, filed May 27, 1960, assigned to the assignee of the present invention relates to a somewhat similar column assembly and illustrates embodiments utilizing both mechanically and electrically actuated latch mechanisms. This invention relates to an improved column and mechanically actuated latch mechanism.

Further objects and advantages of this invention will become more apparent as this description proceeds, particularly when considered in connection with the accompanying drawings, wherein.

Figure 1:
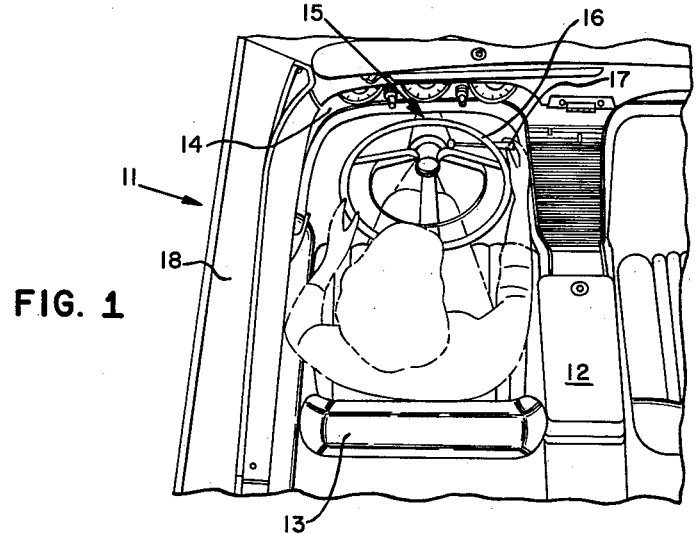
FIGURE 1 illustrates a portion of a motor vehicle incorporating this invention showing the steering column in its normal operative position.
Figure 2:
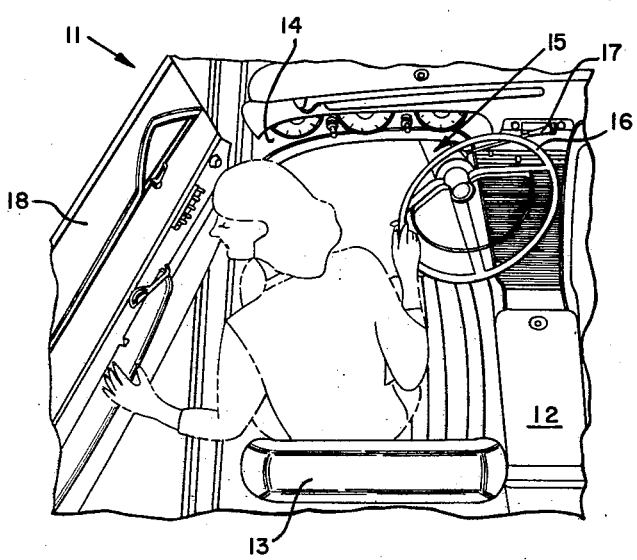
FIGURE 2 is a view in part similar to FIGURE 1 showing the steering column displaced inwardly to facilitate ingress and egress by the driver.
Figure 3:
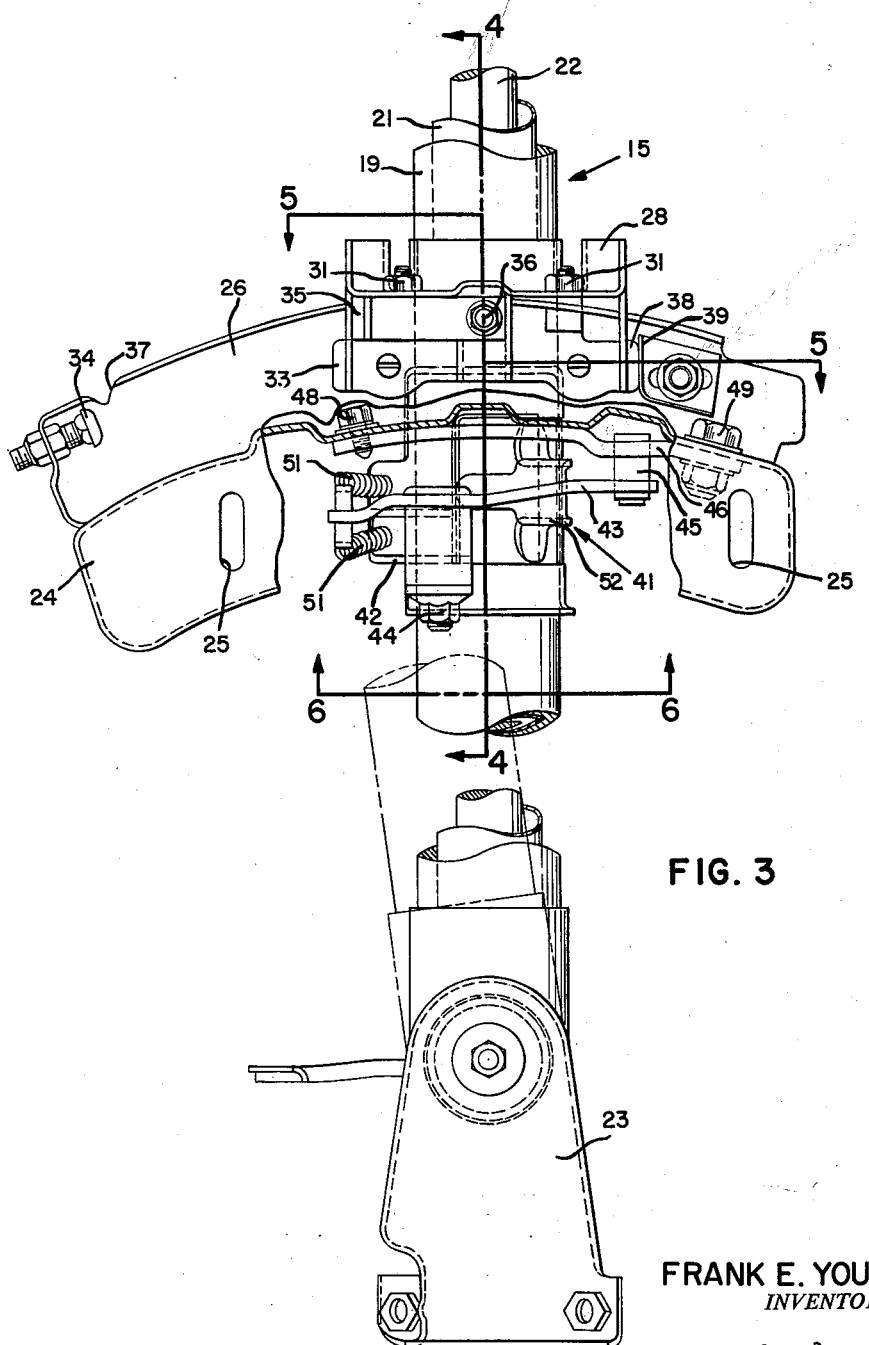
FIGURE 3 is a top plan view of the steering column embodying the present invention showing the column in its normal operative position in full lines and in an inwardly displaced position in phantom.
Figure 4:
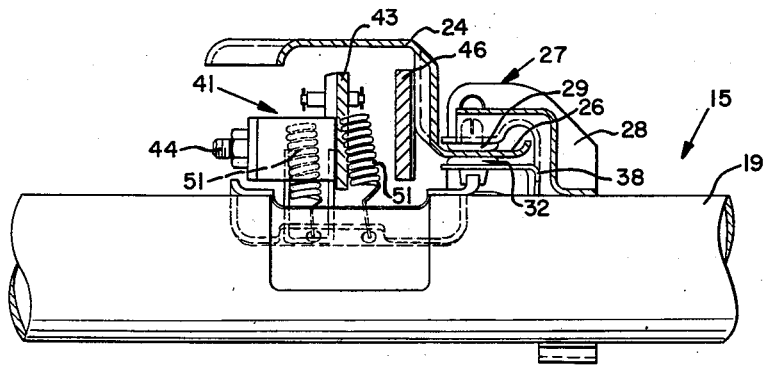
FIGURE 4 is a cross sectional view taken along line 4—4 of FIGURE 3.
Figure 5:
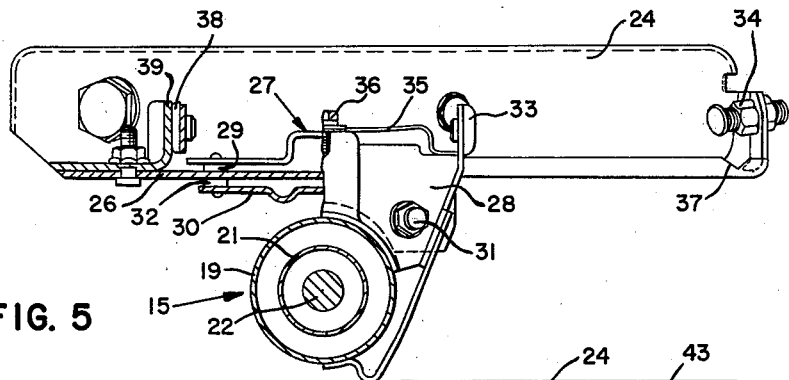
FIGURE 5 is a cross sectional view taken along line 5—5 of FIGURE 3.

Referring now to the drawings and in particular to FIGURES 1 and 2, there is shown generally at 11 a portion of a motor vehicle having the passenger compartment 12. Motor vehicle 11, as is conventional, incorporates an engine, transmission and final drive means (not shown). A bucket type driver's seat 13 is suitably supported within passenger compartment 12. Supported under the instrument panel 14 are the steering column assembly 15 and the steering wheel 16. Wheel 16 overlies driver's seat 13 and is positioned directly in front of the driver when in the normal operative position (see FIGURE 1). Steering column assembly 15 supports the transmission ratio selector lever 17 in a conventional manner. To facilitate ingress and egress of the driver through door 18, steering column assembly 15 and wheel 16 may be inwardly displaced (see FIGURE 2) in the manner to be described.

Referring now to the remaining figures, the construction of the movable steering column assembly 15 is shown in detail. Steering column assembly 15 includes the mast 19 which encloses and rotatably supports the transmission ratio selector tube 21. Transmission selector ratio lever 17 is connected to selector tube 21 to allow the driver to select the desired transmission drive ratio between the vehicle engine and the drive wheels in the known manner. Concentrically disposed within selector tube 21 and rotatable with respect thereto is the steering shaft 22. At its upper end steering shaft 22 is connected for rotation with sterring wheel 16. At its lower end steering shaft 22 is connected to the conventional steering linkage to transmit motion from steering wheel 16 to the dirigible wheels of vehicle 11. Swinging movement of the steering column assembly 15 relative to the steering mechanism is permitted by connecting shaft 22 to the steering mechanism by a universal motion transmitting mechanism, for example a flexible shaft or universal joint (not shown).

The lower end of steering column assembly 15 is pivotally supported by bracket 23. Bracket 23 is supported from any convenient body or frame member by a suitable connection. Near its upper end the column assembly 15 is supported for movement by the bracket 24. Bracket 24 is apertured, as at 25, to allow the attachment of bracket 24 to the underside of the vehicle dashboard as by bolts (not shown). Apertures 25 are elongated to provide for adjustment of the position of bracket 24. Bracket 24 is formed with a track portion 26.

The mast 19 and attendant steering column assembly 15 are supported for movement along track 26 by the mechanism generally indicated at 27. Mechanism 27 includes the bracket 28 which encircles mast 19 and is suitably secured thereto. Bracket 28 carries the nylon bearings 29, only one of which is shown, which bears against the upper surface of track 26. A further bracket 30 is secured to bracket 28 as by the bolts 31. Bracket 30 supports the nylon bearings 32, only one of which is shown, which bears against the lower edge of track 26. Bearings 29 and 32 support column assembly 15 for movement by sliding along the upper and lower faces of track 26.

The degree of swinging movement of column assembly 15 inwardly is limited by contact of the nylon bumper 33, carried by one of the upstanding portions of bracket 28, with the adjustable stop 34. A single leaf spring 35 is secured to bracket 27 as by the bolt 36. The end of spring 35 serves as a detent by movement into the notch 37 formed in track 26 to resiliently hold column assembly 15 in the inwardly displaced position. The location of steering column assembly 15 in the normal operative position may be adjusted by selective positioning of the adjustable stop 39 which coacts with the nylon bumper 38, carried by the other upstanding projection of bracket 28.

Steering column assembly 15 is retained in its normal operative position by the latch assembly generally indicated at 41. Latch assembly 41 includes a bracket 42 which is suitably secured to mast 19. A lever 43 is pivotally supported on bracket 42 by the pin 44. Lever 43 carries the detent member 45 near one end thereof. A plate 46 having the notch 47 is secured to support bracket 24 as by bolts 48 and 49. Detent member 45 is adapted to engage notch 47 and the coaction of detent member 45 with notch 47 locks column assembly 15 in the normal operative position. Proper alignment of column assembly 15 in this position may be maintained by selective adjustment of stop 39 and plate 46. Detent 45 is maintained in engagement with notch 47 by the action of the coil springs 51 interposed between bracket 42 and lever 43.

Release of detent 45 from notch 47 to allow movement of the column assembly 15 is accomplished by selective movement of transmission ratio selector lever 17 and selector tube 21. Motion is transmitted to lever 43 from selector tube 21 by means of the cam 52 secured to selector tube 21. Apertures are formed in mast 19 and bracket 42 to provide clearance and allow cam 52 to communicate with lever 43. The outwardly extending end of the cam 52 can engage inwardly extending end 53 of lever 43 (see FIG. 7). This coaction is accomplished by rotation of selector tube 21 in a clockwise direction from the position shown in FIGURE 6 to the position shown in FIGURE 7. This movement brings cam 52 into contact with the end 53 of lever 43 causing the latter to pivot in a clockwise direction. This, in turn, causes detent 45 to move free of notch 47 freeing column assembly 15 for movement along track 26. In the position shown in FIGURE 7, cam 52 moves into registry with the notch 54 formed in lever 43. With column assembly 15 displaced, selector tube 21 cannot be rotated in a counter clockwise direction because of the coaction between cam 52 and notch 54 and the interference between detent 45 and the lower surface of plate 46. As column assembly 15 is returned to its normal operative position, selector tube 21 may be rotated in a counter clockwise direction to actuate lever 43 and lock column assembly 15 in place.

*Operation*

Figures 6, 7:
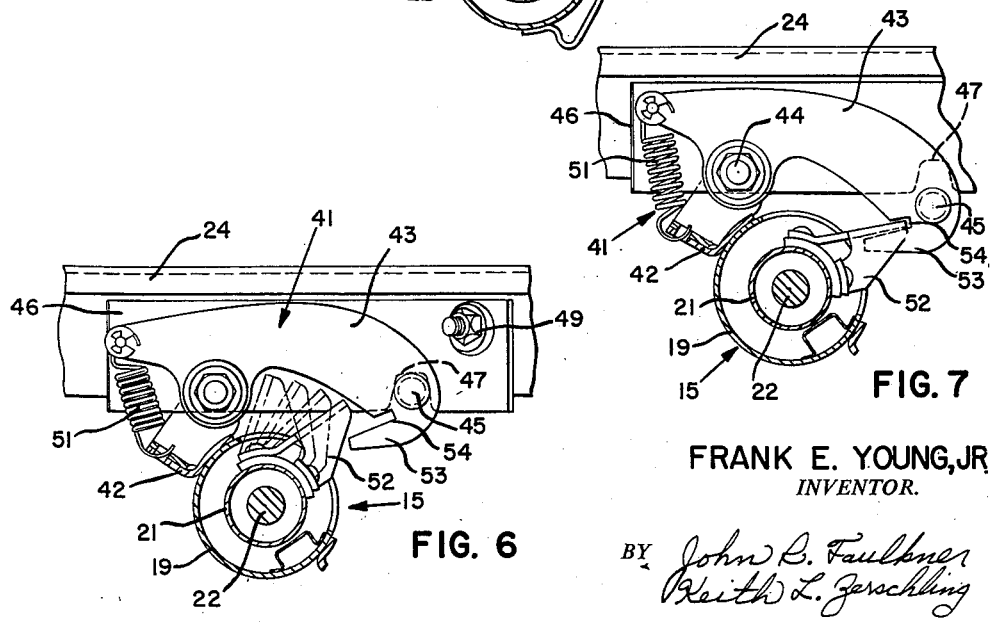
FIGURE 6 is a cross sectional view taken along line 6—6 of FIGURE 3 showing the latch mechanism for the column in its engaged position.
FIGURE 7 is a cross sectional view in part similar to FIGURE 6 showing the latch mechanism disengaged.

As has been noted, vehicle 11 incorporates a transmission and final drive means for the transmission of power from the vehicle engine to the drive wheels. For the purpose of this description the transmission will be assumed to be one of the automatic type. Such transmissions generally provide one or more forward speeds, one reverse speed and at least one nonpower transmitting or "neutral" condition. In addition, these transmissions generally provide a nonpower transmitting condition in which the drive wheels are locked against rotation. This latter condition is commonly called a "park" position. Control of the transmission ratio is accomplished by selective movement of lever 17 and tube 21. The dotted line positions of FIGURE 6 and the full line positions of FIGURES 6 and 7 represent the positions of lever 17, tube 21 and cam 52 corresponding to each of the respective transmission conditions. The extreme position of lever 17 shown in FIGURE 7, corresponds to the "park" position.

Placement of lever 17 in the "park" position and accordingly cam 52 in the position shown in FIGURE 7 releases lever 43 and detent 45. Column assembly 15, therefore, can be moved only when the transmission is in this nonpower transmitting condition. With column 15 displaced, the transmission cannot be shifted into gear because of the interference between detent 45 and plate 46. When column assembly 15 is returned to its normal position and a power transmitting condition of the transmission is selected by rotation of lever 17 and tube 21, column assembly 15 will again be locked in the normal position by latch assembly 41. As may be seen from FIGURE 6, movement of lever 17 into any of the positions other than that corresponding to the "park" position will have no effect on lever 43.

It can thus be seen that this invention provides a movable steering column and latch assembly which is automatically actuated by the movement of the transmission ratio selector. The column can only be moved in a nonpower transmitting condition of the transmission. With the column displaced, a power transmitting condition of the transmission cannot be selected.

It will be understood that the invention is not to be limited to the exact construction shown and described, but that various changes and modifications may be made without departing from the spirit and scope of the invention, as defined by the appended claims.

I claim:
1. In a motor vehicle, propulsion means, final drive means, transmission means adapted to selectively transmit power from said propulsion means to said final drive means, control means selectively positionable to direct the transmission of power to said final drive means, said control means having at least one position thereof providing nonpower transmitting operation of said transmission means, a support structure, a steering column, means supporting said steering column on said support structure for swinging movement from a normal operative position to an inwardly displaced position, lever means pivotally supported by said steering column, means on said lever means coacting with said support means effective to lock said steering column in said operative position, and means actuated by said control means operative to pivot said lever means when said control means is in said one position to free said means on said lever from support whereby said steering column may be swung to said inwardly displaced position.

2. In a motor vehicle, propulsion means, final drive means, transmission means adapted to selectively transmit power from said propulsion means to said final drive means, control means selectively positionable to direct the transmission of power to said final drive means, said control means having at least one position thereof providing nonpower transmitting operation of said transmission means, a support structure, a steering column, means supporting said steering column on said support structure for swinging movement from a normal operative position to an inwardly displaced position, lever means pivotally supported by said steering column, interengaging means on said lever means and said support structure effective to lock said steering column in said normal operative position, resilient means normally urging said interengaging means into interengagement, and means operatively connected to said control means effective to release said interengaging means in response to movement of said control means to said one position whereby said steering column may be moved to said inwardly displaced position.

3. In a motor vehicle, propulsion means, final drive means, transmission means adapted to selectively transmit power from said propulsion to said final drive means, control means selectively positionable to direct the transmission of power to said final drive means, said control means having at least one position thereof providing nonpower transmitting operation of said transmission means, a support structure, a steering column, means supporting said steering column on said support structure for movement from a normal operative position to an inwardly displaced position, lever means pivotally supported by said steering column, interengaging means on said lever means and said support structure effective to lock said steering column in said normal operative position, resilient means normally urging said interengaging means into interengagement, means operatively connected to said control means effective to release said interengaging means in response to movement of said control means to said one position whereby said steering column may be moved to said inwardly displaced position, and means on said support means coacting with said interengaging means on said lever means preventing movement of said control means from said one position when said column is inwardly displaced.

References Cited in the file of this patent

UNITED STATES PATENTS

| | | |
|---|---|---|
| 627,201 | Paget | June 20, 1899 |
| 805,944 | Clark | Nov. 28, 1905 |
| 917,684 | Van Nort | Apr. 6, 1909 |
| 2,436,153 | Sanmori | Feb. 17, 1948 |
| 2,845,810 | Sampson | Aug. 5, 1958 |

FOREIGN PATENTS

| | | |
|---|---|---|
| 542,129 | France | May 12, 1922 |
| 872,026 | France | Jan. 29, 1942 |